United States Patent [19]

Hopkins

[11] 4,194,860
[45] Mar. 25, 1980

[54] FACE MILLING CUTTER

[75] Inventor: David A. Hopkins, Troy, Mich.

[73] Assignee: The Valeron Corporation, Oak Park, Mich.

[21] Appl. No.: 919,229

[22] Filed: Jun. 26, 1978

[51] Int. Cl.$^2$ .............................................. B62D 1/12
[52] U.S. Cl. ........................................ 407/42; 407/36
[58] Field of Search ...................... 407/42, 40, 36, 34; 29/105 A

[56] References Cited

U.S. PATENT DOCUMENTS

| 3,464,098 | 9/1969 | Moore et al. | 407/42 |
| 3,708,843 | 1/1973 | Erkfritz | 407/42 |
| 3,955,259 | 5/1976 | Gustafsson | 407/42 |

Primary Examiner—Leonidas Vlachos

[57] ABSTRACT

A face milling cutter having indexable inserts located in corner pockets at the periphery of the cutting face of the cutter body angularly positioned to provide a cutting edge extending from a point of maximum cutting depth in a direction progressively outward from the axis of rotation, progressively backward relative to direction of rotation and of progressively reduced cutting depth totalling a minor fraction of the outward extension, together with a secondary wiping cutting edge extending from the cutting point inwardly and backwardly relative to the axis and direction of rotation and substantially in the cutting plane of rotation thus providing effective cutting and wiping action in angularly related cutting edges of the same insert.

20 Claims, 5 Drawing Figures

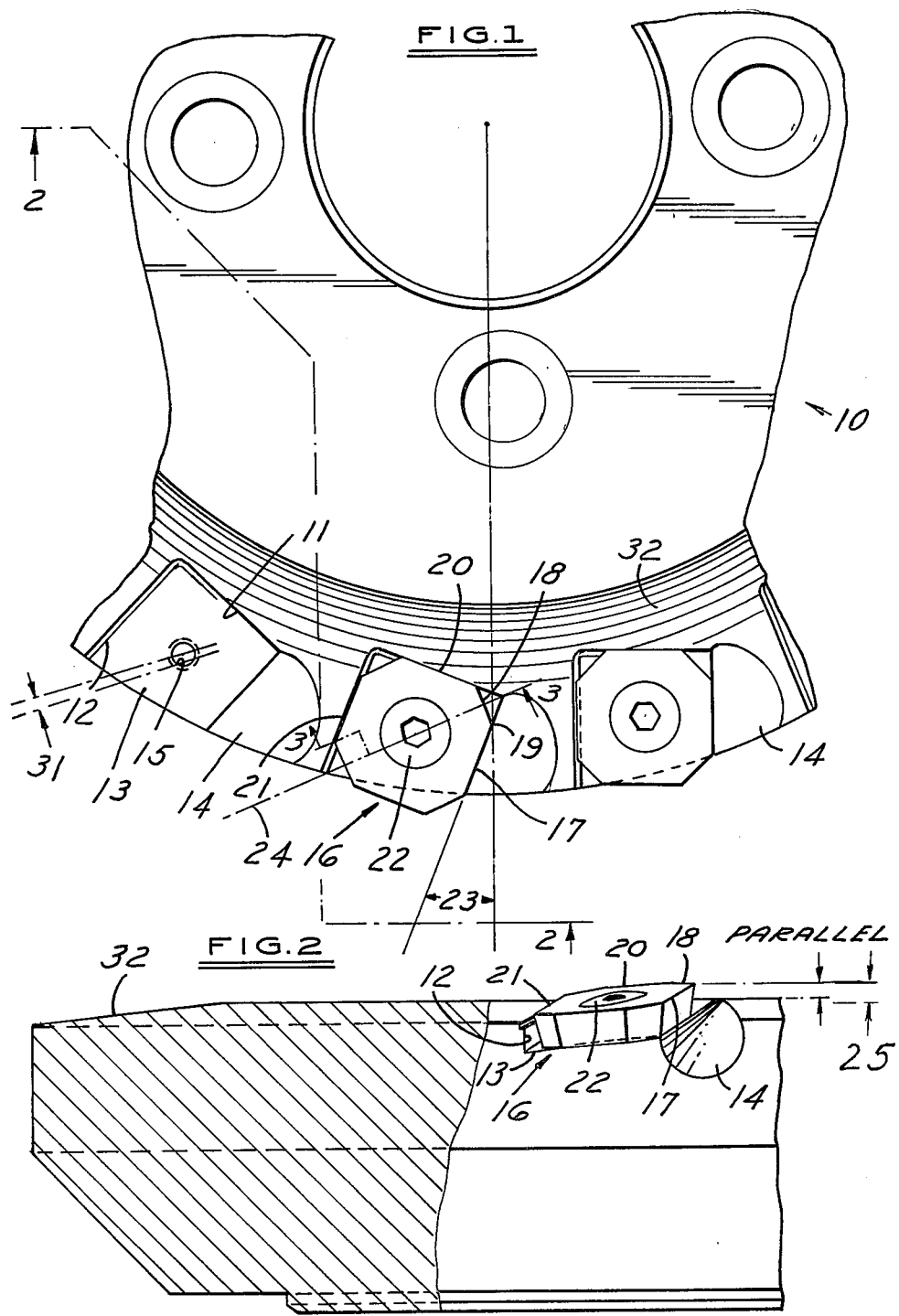

FACE MILLING CUTTER

BACKGROUND OF THE INVENTION

Conventional face milling cutters with round or polygonal parallel cutting and seating faces extending in nearly axial planes normally require roughing and finishing cuts and frequently further surface smoothing operations, particularly in cutting tough metal such as titanium or alloy steels having difficult machining properties. Normally when such cutters are employed in making relatively shallow face milling cuts only a very limited minor portion of the cutting edge is involved in the cutting action; and any wiping cutting edge to effect a smooth surface finish is provided in one or more auxiliary inserts specially located in the cutter body for such purpose. Examples of such prior art are found in U.S. Pat. Nos. 3,303,555, 3,371,397 and 3,391,438.

It is known in some prior art constructions to place one or more inserts with main parallel faces extending generally circumferentially. In such cases the faces may extend in substantially diagonal conical corner portions of the cutter body as in the case of U.S. Pat. Nos. 1,460,838 (FIG. 3), 3,716,900 and 3,818,562 as well as German Pat. No. 2,016,193. In some face milling cutters employing flat circular inserts the main cutting face for one or more finishing inserts has been located nearly parallel to a radial plane normal to the axis, examples being shown in U.S. Pat. Nos. 3,371,397, 3,464,098. In one prior art U.S. cutter Pat. No. 3,708,843, FIG. 1 of which superficially is closest in general appearance to applicant's construction of any known prior art, a plurality of flat generally square tungsten carbide inserts, having two opposite sides provided with rounded edges extending the length of the sides, are located in corner pockets the seating surfaces of which all lie in a shallow cone having a small angular relationship with a radial plane extending normal to the axis. However, the cutter is such case is a boring tool in no way adapted to provide face milling cutting.

SUMMARY OF THE PRESENT INVENTION

This invention provides a rotary face milling cutter wherein a plurality of equally circumferentially spaced cutting edges project from the cutting face, each extending from a point of maximum cutting depth in a direction progressively outward from the axis of rotation, progressively backward relative to direction of rotation and of progressively reduced cutting depth. A supplemental wiping cutting edge extends from each cutting point inwardly and backwardly relative to the axis and direction of rotation and in the cutting plane which includes the cutting point.

In applicant's preferred embodiment generally square positive indexable inserts, having their corners truncated to provide the supplemental diagonal wiping cutting edges, are located in corner pockets formed in a generally shallow conical cutting face perimeter of the cutter body so that the main active cutting edge of each insert extends as described above while the radially innermost adjacent corner cutting edge extends as indicated above to provide a wiping cutting edge.

In adapting the cutter to difficult to machine materials such as titanium, the main active cutting edge of each indexable tungsten carbide insert is provided with a shear angle of approximately 25° relative to a radial plane passing through the cutting point and axis while the extension of such cutting edge in an axial direction is limited in accordance with the maximum depth of cut for which the cutter will be used so that a majority of such cutting edge engages the chip even where the cutter is employed for relatively shallow depths of cut. In adapting the cutter to more freely cutting steels and other materials the shear angle is preferably reduced to approximately 15° and the axial extension of the cutting edge is again proportioned to the maximum depth of cut which may be substantially greater than in the case of titanium.

Corner pockets provided in the outer face perimeter of the cutter body include a flat seat and corner shoulders for engaging the tapered sides associated with an adjacent pair of inactive main cutting edges. Each insert is held against its bottom seat and shoulders by a conically headed screw extending through the center of the insert.

Unusually high cutting speed, smoothness of surface without supplemental finishing cut, durability of inserts for each index position, simplicity of manufacture and freedom from critical tolerances or any need for installation adjustment make this face milling cutter a most significant advance in the art.

BRIEF DESCRIPTION OF THE DRAWINGS

FIG. 1 is a fragmentary front elevation of the cutter showing a pair of adjacent inserts installed and one pocket with its insert omitted.

FIG. 2 is a fragmentary sectional view taken along the line 2—2 of FIG. 1;

With reference to FIG. 1 a cutter body 10 is provided with a plurality of equally circumferentially spaced insert locating pockets having right angle corner shoulders 11 and 12, and a bottom seating surface 13 terminating at a chip clearance groove 14. A tapped hole 15 for an insert retention screw extends into the body normal to the seating surface 13 of each insert locating pocket.

Figure 3:
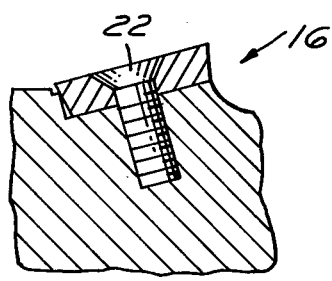
FIG. 3 is a fragmentary sectional view taken along the line 3—3 of FIG. 1.

The cutter body illustrated is provided with 16 (3 shown in FIG. 1) insert pockets, each of which locates an essentially square indexable insert 16 to provide a main active cutting edge 17 and a supplemental wiping cutting edge 18. Beveled sides 20 and 21 of each insert engage respectively pocket shoulders 11, 12 forceably retained in positively located position by tapered flathead screw 22. The illustrated cutter, adapted for the face milling of titanium, is provided with a shear angle 23 of approximately 25° and a negative rake angle along the diagonal line 24 of approximately 15°, as most clearly shown in the fragmentary view of FIG. 3, providing a maximum potential depth of cut determined by the extremity of the active cutting edge 17 as indicated at 25 in FIG. 2.

Figure 4:
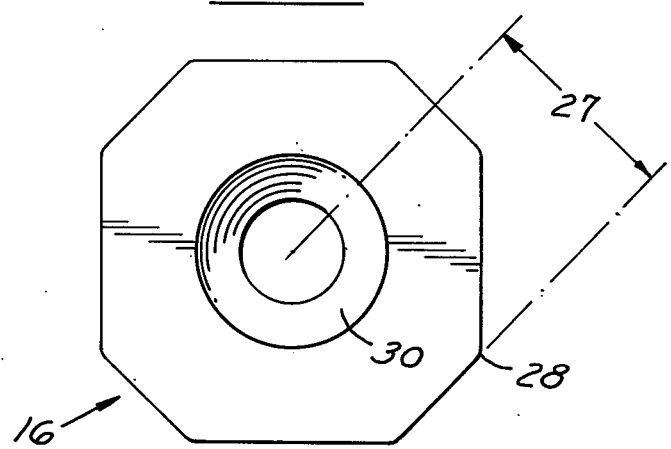
FIG. 4 is an enlarged face view of one of the inserts per se shown in FIG. 1.
Figure 5:
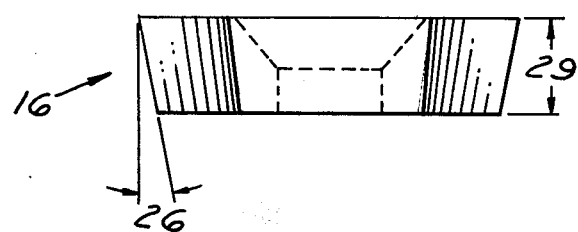
FIG. 5 is a side elevation of the insert shown in FIG. 4.

Each of the sides of the insert, including the corner sides, is provided with a conventional positive clearance angle 26 of approximately 11° as shown in FIG. 5. The relative length of the corner wiping edge is established by the dimension 27 indicated in FIG. 4, which may be in the order of 0.540" in the case of a 1" I.C. insert as illustrated. Each corner 28 of such insert is preferably slightly rounded as with a 0.031 radius which together with symmetrical truncating renders the insert useable in either right or left hand milling cutters. A conventional thickness 29 (FIG. 5) in the order 0.250" is employed as well as a central tapered hole 30 for the retention screw which is centrally located and offset as indicated at 31 in FIG. 1 relative to the tapped hole in the body in the order of 0.015"–0.018" insuring tight corner engagement against the shoulders 11, 12 as well as the seat 13. The upper edge of the shoulder 12 has been relieved as indicated in FIGS. 1 and 2 to minimize the possibility of upper edge nicks causing mislocation of the adjacent insert side. A conical bevel 32 at the outer face perimeter of the body as best shown in FIG. 2 provides an approximately parallel relationship slightly below the inactive cutting edge 21 of an installed insert.

A preferred embodiment of the cutter as described employing 16 equally spaced one inch I.C. inserts in a ten inch diameter face mill, as measured over the installed inserts, and provided with aforementioned 25° shear and 15° negative rake angles was found to produce remarkable results in machining titanium in approximately one-third the time normally required. A rotational speed of 120 surface feet per minute with a depth of cut up to 1/10" and a table feed providing a 0.020" per insert feed rate was found to provide a completely satisfactory surface finish in a single pass compared with normal requirements for a roughing cut, and a finishing cut supplemented by additional hand buffing. Thus, on a given job for machining titanium previously preformed by a round insert cutter which required many hours of rough and finish cutting with several stops for indexing and final hand buffing, the described cutter of this invention was able to finish the job is only one-third the time using a single cut with no hand buffing necessary and no stop for indexing, the initial active cutting edges still being in serviceable condition for further milling after more than five hours of continuous cutting.

This remarkable result is believed to be attributable to a number of features: Continuous curled chips of a length corresponding to the sweep of each cutter insert and a thickness resulting from 0.020" per insert feed rate were found to discharge radially from each chip relief groove 14 without touching the cutter body while extremely narrow chips known as "fuzz" developed by the effective wiping edge were fed inwardly thereby providing desirable opposite chip flow at the critical cutting point 19 avoiding any buildup and minimizing pressure at the entering point contact. The shearing action of the active cutting edge employing almost its entire length in effecting even a relatively shallow depth of cut accommodated exceptionally high feed rates compared with conventional practice in machining titanium. By making the length of the wiping edge sufficient to equal the feed rate per revolution of the cutter, an exceptionally smooth finish was obtained immediately without any initial cutter wear-in and without any necessity for precision matching or adjustment of individual inserts upon installation. Thus, even though one of the 16 inserts is inherently slightly higher than the rest in its effective wiping engagement, the fact that it overlaps its own previous wiping path with each revolution provides an assured continuous smooth surface finish of uniform profile.

Tests at various shear angles of the cutting edge 17 demonstrated 25° to be optimum with 20°–30° covering an acceptable range for titanium; 15° proved to be optimum for stainless and all other steels as well as other metals, with 10° to 30° defining an acceptable range. While useable with certain metals, a shearing angle of less than 10° provides the possibility of undersirable impact of the entire cutting edge 17 upon entering the workpiece as distinguished from desirable progressive engagement starting at the cutting point 19.

With a shear angle established as the primary consideration and the wiping edge 18 positioned in the cutting plane, a negative rake angle should be chosen along the diagonal line normal to the wiping edge 18 just sufficient to provide an extension of the cutting edge 17 in an axial direction sufficient to cover the maximum depth of cut for which the cutter will be employed. In the illustrated embodiment at 15° negative rake angle accommodates approximately 1/10 inch maximum depth of cut which in the case of titanium will cover most practical applications. Somewhat greater depths of cut may be involved in face milling steel and other metals and a range of 3° to 30° might be appropriate in satisfying very light to heavy depths of cut.

Since the extent of wiping edge at the corner of each insert proportionately diminishes the extent of cutting edge available for maximum depth of cut at any given negative rake angle, it will be possible to reduce the extension of wiping edge for applications where extreme smoothness of surface is not critical, relying on more than one insert to effectively contribute to the wiping action. In such case initial use of the cutter will normally result in wear-in of the predominate wiping edge and actually improve the surface finish as supplemental wiping edges subsequently come into play. It should be understood that the present cutter construction contemplates no special selective sizing of inserts or adjustment at installation and will be effective to produce extreme high quality of surface finish with only conventional precision machining of the pockets and manufacture of inserts. In order to assure maximum life in practical applications it is preferable to limit the width of cut to approximately 75% of the effective cutting diameter in order to avoid entering the cut with "0" chip thickness, as in the case of channel cutting.

While the preferred embodiment illustrated herein employs square inserts with truncated corners located in 90° corner pockets, a similar result may be obtained with triangular inserts having truncated points located in matching corner pockets; and likewise pentagon inserts could be used in place of the square inserts shown. In any such alternative case the effective shear angle of the active cutting edge is the starting point, the adjacent corner wiping edge in the plane of cutting the second factor, and negative rake angle only sufficient to accommodate maximum depth of cut, the final consideration in establishing pocket disposition for proper insert location.

I claim:

1. A face milling cutter comprising a rotatable annular body, means to provide a plurality of circumferentially spaced individual cutting edges projecting from the cutting face of said body, each cutting edge extending from a point of maximum cutting depth in a direction progressively outward from the axis of rotation, progressively backward relative to direction of rotation, and of progressively reduced cutting depth totalling a minor fraction of said outward extension, and supplemental cutting edges each relieved radially inwardly and backwardly from a radial plane passing through said point and the cutter axis.

2. A cutter as set forth in claim 1 including cutting edges which each extend in a substantially straight line from said point of maximum cutting depth.

3. A cutter as set forth in claim 1 including cutting edges each having a shearing angle relative to a radial plane passing through said cutting point and the cutter axis which is approximately 25°.

4. A cutter as set forth in claim 1 including cutting edges each having a shearing angle relative to a radial plane passing through said cutting point and the cutter axis which is within a range of approximately 20° to 30°.

5. A cutter as set forth in claim 1 including cutting edges each having a shearing angle relative to a radial plane passing through said cutting point and the cutter axis which is approximately 15°.

6. A cutter as set forth in claim 1 including cutting edges each having a shearing angle relative to a radial plane passing through said cutting point and the cutter axis which is within a range of approximately 10° to 30°.

7. A face milling cutter comprising a rotatable annular body, means to provide a plurality of circumferentially spaced individual cutting edges projecting from the cutting face of said body, each cutting edge extending from a point of maximum cutting depth in a direction progressively outward from the axis of rotation, progressively backward relative to direction of rotation, and of progressively reduced cutting depth totalling a minor fraction of said outward extension, said cutting edges including a wiping cutting edge extending from each cutting point inwardly relative to the axis of rotation and substantially in the cutting plane of rotation.

8. A cutter as set forth in claim 7 wherein each said wiping edge extends rearwardly from said cutting point relative to the direction of rotation.

9. A cutter as set forth in claim 8 wherein each said wiping cutting edge is relatively shorter than its adjacent cutting edge.

10. A cutter as set forth in claim 8 wherein the plane of said cutting edges extends at approximately a 15° negative rake angle relative to the cutting plane of rotation.

11. A cutter as set forth in claim 8 wherein the plane of said cutting edges extends within a range of approximately 3° to 30° negative rake angle relative to the cutting plane of rotation.

12. A cutter as set forth in claim 8 wherein said cutting point is only slightly rounded as in the order of 0.03" radius.

13. A cutter as set forth in claim 9 wherein each said first cutting edge is approximately twice as long as said wiping edge.

14. A cutter as set forth in claim 1 wherein said edges are formed essentially as polygonal faced indexable inserts having a wiping edge extending across each corner.

15. A cutter as set forth in claim 1 wherein said edges are formed essentially as polygonal faced indexable inserts having a wiping edge extending across each corner forming approximately a 135° angle with each adjacent cutting edge.

16. A cutter as set forth in claim 14 including a corner pocket formed in the outer periphery of the cutting face of said body for engaging a pair of side surfaces of said insert.

17. A cutter as set forth in claim 16 wherein each of the sides of said insert is provided with a clearance angle of approximately 11°.

18. A cutter as set forth in claim 16 wherein each of the sides of said insert is provided with a clearance angle of within an approximate range of 0° to 20°.

19. A cutter as set forth in claim 16 wherein a shallow conical surface is provided on the outer perimeter of the cutting face of said body to provide a back pocket shoulder extending substantially parallel at its upper edge to the adjacent edge of said insert.

20. A face milling cutter comprising a rotatable annular body, a plurality of equally circumferentially spaced corner pockets formed in the outer periphery of the cutting face of said body for engaging a bottom and a pair of side insert surfaces, an indexable cutting insert installed in each of said pockets having a polygonal face angled relative to the cutting plane of said cutter with a pair of active adjacent cutting edges extending with an obtuse included angle from a cutting point of maximum cutting depth, one of said edges extending in a direction progressively outward from the axis of rotation, progressively backward relative to direction of rotation, and a progressively reduced cutting depth totalling a minor fraction of said outward extension, and the other of said cutting edges extending inwardly relative to the axis of rotation, rearwardly relative to the direction of rotation, and substantially in the cutting plane of rotation.

* * * * *